US012592069B2

(12) United States Patent   (10) Patent No.:   US 12,592,069 B2
Meng et al.   (45) Date of Patent:   Mar. 31, 2026

(54) OBJECT RECOGNITION METHOD AND APPARATUS, AND DEVICE AND MEDIUM

(71) Applicant: SHANDONG YINGXIN COMPUTER TECHNOLOGIES CO., LTD., Jinan (CN)

(72) Inventors: Fancheng Meng, Jinan (CN); Hongliang Wang, Jinan (CN); Qi Mou, Jinan (CN)

(73) Assignee: SHANDONG YINGXIN COMPUTER TECHNOLOGIES CO., LTD., Jinan (CN)

( * ) Notice: Subject to any disclaimer, the term of this patent is extended or adjusted under 35 U.S.C. 154(b) by 340 days.

(21) Appl. No.: 18/270,222

(22) PCT Filed: Jan. 28, 2022

(86) PCT No.: PCT/CN2022/074497
§ 371 (c)(1),
(2) Date: Jun. 29, 2023

(87) PCT Pub. No.: WO2022/179382
PCT Pub. Date: Sep. 1, 2022

(65) Prior Publication Data
US 2024/0071066 A1    Feb. 29, 2024

(30) Foreign Application Priority Data
Feb. 25, 2021   (CN) ......................... 202110210521.X

(51) Int. Cl.
*G06V 10/00*       (2022.01)
*G06V 10/40*       (2022.01)
*G06V 10/82*       (2022.01)
(52) U.S. Cl.
CPC .............. *G06V 10/82* (2022.01); *G06V 10/40* (2022.01)

(58) Field of Classification Search
CPC ........ G06V 10/82; G06V 10/40; G06V 20/20; G06V 10/462; G06F 18/2415; G06N 3/045; G06N 3/08
See application file for complete search history.

(56) References Cited

U.S. PATENT DOCUMENTS 11,868,878 B1 *  1/2024  Huang ................... G06N 3/084
2017/0132496 A1 *  5/2017  Shoaib ................... G06N 3/048
(Continued)

FOREIGN PATENT DOCUMENTS

CN    106779060 A  *  5/2017  ............... G06N 3/08
CN    109657582 A    4/2019
(Continued)

OTHER PUBLICATIONS

Liu, Feng, Tongsheng Shen, and Xinxing Ma. "Convolutional neural network based multi-band ship target recognition with feature fusion." Acta Optica Sinica 37.10 (2017): 1015002.
(Continued)

*Primary Examiner* — Xiao Liu
(74) *Attorney, Agent, or Firm* — IPro, PLLC

(57)        ABSTRACT

Disclosed are an object recognition method and apparatus, and a device and a medium. The method comprises: by a convolutional layer in a convolutional neural network, extracting pre-selected feature information of objects to be recognized, and performing dimension reduction processing on the pre-selected feature information by using a pooling layer, to obtain feature information; processing the feature information by a fully connected layer, to obtain processed feature information, extracting a target feature value from the processed feature information, and compiling statistics on the number of objects to be recognized; by the fully connected layer and according to the target feature value, determining corresponding target queue information from pre-stored queue information; and by the fully connected (Continued)

By means of a convolutional layer in the convolutional neural network, extract pre-selected feature information of objects to be recognized, and perform dimension reduction processing on the pre-selected feature information by using a pooling layer in the convolutional neural network, so as to obtain feature information of the objects to be recognized — S11

Process the feature information by means of a fully connected layer in the convolutional neural network, so as to obtain processed feature information, extract a target feature value from the processed feature information, and compile statistics on the number of objects to be recognized — S12

By means of the fully connected layer and according to the target feature value, determine, from pre-stored queue information, target queue information corresponding to the target feature value — S13

By means of the fully connected layer, perform comparative analysis on the processed feature information and reference feature information of each sample object in a queue corresponding to the target queue information, and output a recognition result corresponding to the objects to be recognized — S14 layer, performing a comparative analysis on the processed feature information and reference feature information of each sample object in a queue corresponding to the target queue information, and outputting a corresponding recognition result.

18 Claims, 4 Drawing Sheets

(56) References Cited

U.S. PATENT DOCUMENTS

| | | | |
|---|---|---|---|
| 2018/0218203 A1 | 8/2018 | Lawson et al. | |
| 2020/0242153 A1* | 7/2020 | Luo | G06V 10/764 |

FOREIGN PATENT DOCUMENTS

| | | | | |
|---|---|---|---|---|
| CN | 109740679 A | | 5/2019 | |
| CN | 109753853 A | * | 5/2019 | |
| CN | 110472529 A | * | 11/2019 | G06F 18/214 |
| CN | 111010493 A | | 4/2020 | |
| CN | 111222569 A | * | 6/2020 | G06F 18/24 |
| CN | 111310511 A | | 6/2020 | |
| CN | 110058816 B | * | 9/2020 | G06F 3/0659 |
| CN | 112949446 A | | 6/2021 | |
| WO | 2017167114 A1 | | 10/2017 | |
| WO | WO-2020134099 A1 | * | 7/2020 | G06V 10/40 |

OTHER PUBLICATIONS

Yajun Sun, et al. "Performance Analysis on Parallel Implementation of Fully-and Random-Connected ANN." Computer Science, 27(3), Dec. 2000.
Hussain, Shehzeen, et al. "Fastwave: Accelerating autoregressive convolutional neural networks on fpga." 2019 IEEE/ACM International Conference on Computer-Aided Design (ICCAD). IEEE, 2019.
Tsai, Tsung-Han, and Yuan-Chen Ho. "A CNN accelerator on FPGA using binary weight networks." 2020 IEEE International Conference on Consumer Electronics—Taiwan (ICCE—Taiwan). IEEE, 2020.

* cited by examiner

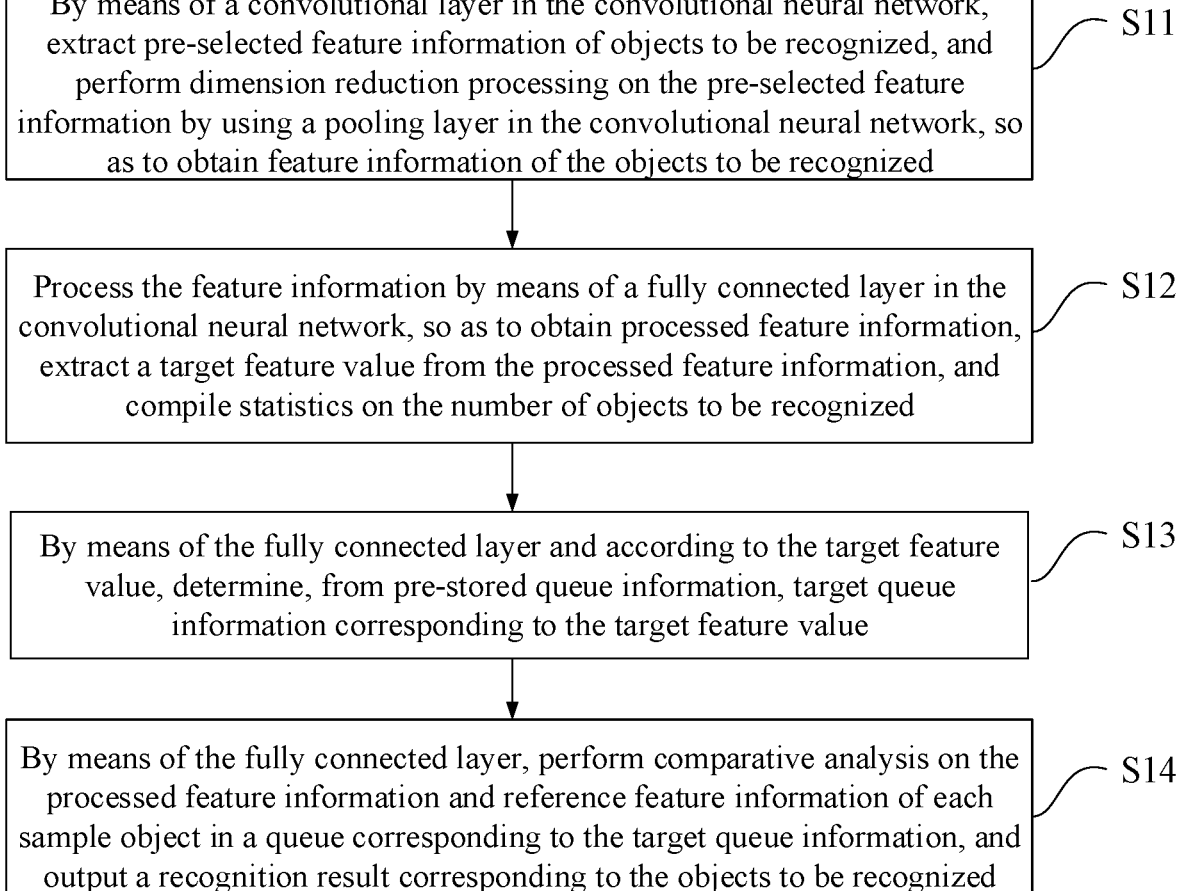

By means of a convolutional layer in the convolutional neural network, extract pre-selected feature information of objects to be recognized, and perform dimension reduction processing on the pre-selected feature information by using a pooling layer in the convolutional neural network, so as to obtain feature information of the objects to be recognized — S11

Process the feature information by means of a fully connected layer in the convolutional neural network, so as to obtain processed feature information, extract a target feature value from the processed feature information, and compile statistics on the number of objects to be recognized — S12

By means of the fully connected layer and according to the target feature value, determine, from pre-stored queue information, target queue information corresponding to the target feature value — S13

By means of the fully connected layer, perform comparative analysis on the processed feature information and reference feature information of each sample object in a queue corresponding to the target queue information, and output a recognition result corresponding to the objects to be recognized — S14

FIG. 1

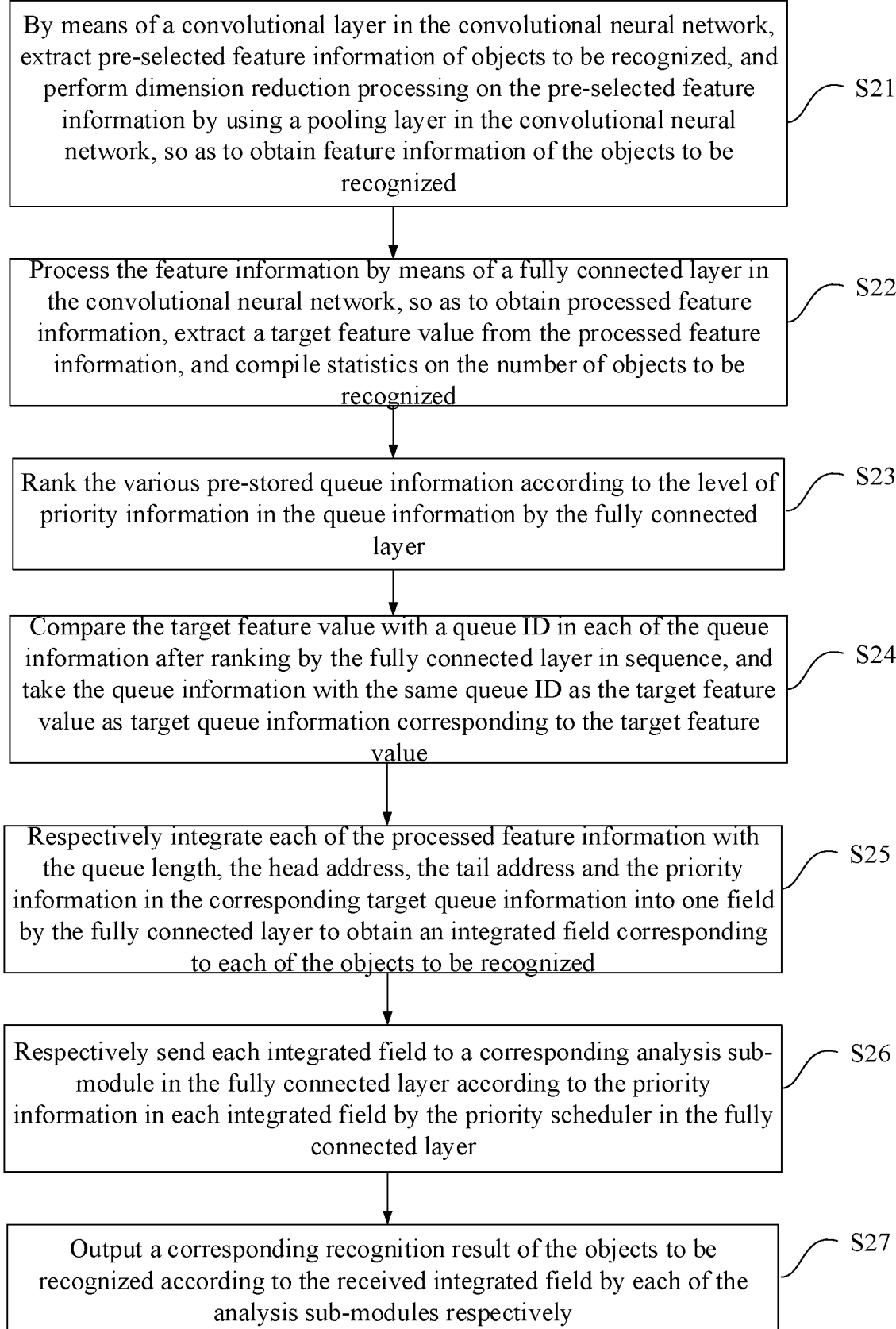

By means of a convolutional layer in the convolutional neural network, extract pre-selected feature information of objects to be recognized, and perform dimension reduction processing on the pre-selected feature information by using a pooling layer in the convolutional neural network, so as to obtain feature information of the objects to be recognized ⟋ S21

Process the feature information by means of a fully connected layer in the convolutional neural network, so as to obtain processed feature information, extract a target feature value from the processed feature information, and compile statistics on the number of objects to be recognized ⟋ S22

Rank the various pre-stored queue information according to the level of priority information in the queue information by the fully connected layer ⟋ S23

Compare the target feature value with a queue ID in each of the queue information after ranking by the fully connected layer in sequence, and take the queue information with the same queue ID as the target feature value as target queue information corresponding to the target feature value ⟋ S24

Respectively integrate each of the processed feature information with the queue length, the head address, the tail address and the priority information in the corresponding target queue information into one field by the fully connected layer to obtain an integrated field corresponding to each of the objects to be recognized ⟋ S25

Respectively send each integrated field to a corresponding analysis sub-module in the fully connected layer according to the priority information in each integrated field by the priority scheduler in the fully connected layer ⟋ S26

Output a corresponding recognition result of the objects to be recognized according to the received integrated field by each of the analysis sub-modules respectively ⟋ S27

FIG. 2

OBJECT RECOGNITION METHOD AND APPARATUS, AND DEVICE AND MEDIUM

The present disclosure claims the priority of the Chinese patent application filed on Feb. 25, 2021 before the CNIPA, China National Intellectual Property Administration with the application number of 202110210521.X and the title of "OBJECT RECOGNITION METHOD AND APPARATUS, AND DEVICE AND MEDIUM", which is incorporated herein in its entirety by reference.

FIELD

The present application relates to the technical field of computers and, more particularly, to an object recognition method and apparatus, and a device and a medium.

BACKGROUND

In the process of object recognition, a convolutional neural network is usually used to achieve object recognition. In the existing convolutional neural network, the convolutional layer is mainly used to extract the feature vector of each part of the objects to be recognized. The pooling layer is used to reduce the amount of training parameters, reduce the dimension of the feature vector output by the convolutional layer, reduce the over-fitting phenomenon, retain the effective information therein, reduce the noise transmission, and then transmit the processed feature vectors to the fully connected layer. The fully connected layer classifies the feature vectors according to the received data. After receiving the feature vectors sent by the pooling layer, the fully connected layer needs to process the feature vectors first, and then classifies the processed data by the softmax regression. In the process of using the softmax regression to for classification, it needs to process a large number of parameters, and needs to do comparative analysis with each data in the library, which takes a long time, expands the delay in the recognition process and reduces the efficiency of recognition.

SUMMARY

In view of this, it is an object of the present application to provide an object recognition method and apparatus, and a device and a medium, which can shorten the time consumed by a fully connected layer in a convolutional neural network, reduce the time delay of a recognition process, and improve the recognition efficiency. The specific solution thereof is as follows.

In a first aspect, the present application discloses an object recognition method applied to a pre-constructed convolutional neural network for object recognition, including:

by means of a convolutional layer in the convolutional neural network, extracting pre-selected feature information of objects to be recognized, and performing dimension reduction processing on the pre-selected feature information by using a pooling layer in the convolutional neural network, to obtain feature information of the objects to be recognized;

processing the feature information by means of a fully connected layer in the convolutional neural network, to obtain processed feature information, extracting a target feature value from the processed feature information, and compiling statistics on the number of objects to be recognized;

by means of the fully connected layer and according to the target feature value, determining, from pre-stored queue information, target queue information corresponding to the target feature value, wherein the queue information includes a queue ID, a queue length, a head address and a tail address of each queue; the head address is a storage address of reference feature information of a first sample object in the queue; the tail address is a storage address of reference feature information of a last sample object in the queue, and the queue is established on an DDR;

by means of the fully connected layer, performing comparative analysis on the processed feature information and reference feature information of each sample object in a queue corresponding to the target queue information, and outputting a recognition result corresponding to the objects to be recognized.

In an embodiment of the present application, by means of the fully connected layer and according to the target feature value, the determining, from pre-stored queue information, target queue information corresponding to the target feature value includes:

comparing the target feature value with a queue ID in various pre-stored queue information by the fully connected layer, and taking the queue information with the same queue ID as the target feature value as target queue information corresponding to the target feature value, wherein the target feature value is a shape value.

In an embodiment of the present application, by means of the fully connected layer, the performing comparative analysis on the processed feature information and reference feature information of each sample object in a queue corresponding to the target queue information, and outputting a recognition result corresponding to the objects to be recognized includes:

reading reference feature information of each sample object in a corresponding queue from the DDR according to the target queue information by the fully connected layer;

comparing each of the reference feature information with the processed feature information respectively;

if there is reference feature information which is the same as the processed feature information, taking a sample object corresponding to the reference feature information which is the same as the processed feature information as a recognition result corresponding to the objects to be recognized; and if there is no reference feature information which is the same as the processed feature information, taking a sample object corresponding to the reference feature information with the highest similarity to the processed feature information as a recognition result corresponding to the objects to be recognized.

In an embodiment of the present application, by means of the fully connected layer, the performing comparative analysis on the processed feature information and reference feature information of each sample object in a queue corresponding to the target queue information, and outputting a recognition result corresponding to the objects to be recognized includes:

when the number of the objects to be recognized is larger than 1, by means of the fully connected layer, performing parallel comparative analysis on each of the processed feature information and reference feature information of each sample object in a queue corresponding to the corresponding target queue information, and outputting a recognition result corresponding to each of the objects to be recognized.

In an embodiment of the present application, by means of the fully connected layer and according to the target feature value, the determining, from pre-stored queue information, target queue information corresponding to the target feature value includes:

ranking the various pre-stored queue information according to the level of priority information in the queue information by the fully connected layer;

comparing the target feature value with a queue ID in each of the queue information after ranking by the fully connected layer in sequence, and taking the queue information with the same queue ID as the target feature value as target queue information corresponding to the target feature value.

In an embodiment of the present application, by means of the fully connected layer, the performing comparative analysis on the processed feature information and reference feature information of each sample object in a queue corresponding to the target queue information, and outputting a recognition result corresponding to the objects to be recognized includes:

respectively integrating each of the processed feature information with the queue length, the head address, the tail address and the priority information in the corresponding target queue information into one field by the fully connected layer to obtain an integrated field corresponding to each of the objects to be recognized;

respectively sending each integrated field to a corresponding analysis sub-module in the fully connected layer according to the priority information in each integrated field by the priority scheduler in the fully connected layer; and outputting a corresponding recognition result of the objects to be recognized according to the received integrated field by each of the analysis sub-modules respectively.

In an embodiment of the present application, the outputting a corresponding recognition result of the objects to be recognized according to the received integrated field, by any analysis sub-module includes:

extracting the queue length, the head address and the tail address from the received integrated field by the analysis sub-module, and reading reference feature information of each of the sample objects in the corresponding queue from the DDR according to the queue length, the head address and the tail address; and extracting the processed feature information from the received integrated field by the analysis sub-module, and comparing and analyzing the processed feature information with the reference feature information of each of the sample objects respectively to output a recognition result of the objects to be recognized corresponding to the processed feature information.

In a second aspect, the present application discloses an object recognition apparatus applied to a pre-constructed convolutional neural network for object recognition, including:

a convolutional layer configured for extracting pre-selected feature information of objects to be recognized;

a pooling layer configured for performing dimension reduction processing on the pre-selected feature information to obtain feature information of the objects to be recognized;

a fully connected layer configured for processing the feature information to obtain processed feature information, extracting a target feature value from the processed feature information, and compiling statistics on the number of objects to be recognized;

wherein the fully connected layer is configured for determining, from pre-stored queue information, target queue information corresponding to the target feature value according to the target feature value, wherein the queue information includes a queue ID, a queue length, a head address and a tail address of each queue; the head address is a storage address of reference feature information of a first sample object in the queue; the tail address is a storage address of reference feature information of a last sample object in the queue, and the queue is established on an DDR;

the fully connected layer is configured for performing comparative analysis on the processed feature information and reference feature information of each sample object in a queue corresponding to the target queue information and outputting a recognition result corresponding to the objects to be recognized.

In a third aspect, the present application discloses an object recognition apparatus applied to a pre-set constructed convolutional neural network for object recognition, including:

an acquisition module configured for, by means of a convolutional layer in the convolutional neural network, extracting pre-selected feature information of objects to be recognized, and performing dimension reduction processing on the pre-selected feature information by using a pooling layer in the convolutional neural network, to obtain feature information of the objects to be recognized;

a processing module configured for processing the feature information by means of a fully connected layer in the convolutional neural network, to obtain processed feature information, extracting a target feature value from the processed feature information, and compiling statistics on the number of objects to be recognized;

a determination module configured for, by means of the fully connected layer and according to the target feature value, determining, from pre-stored queue information, target queue information corresponding to the target feature value, wherein the queue information includes a queue ID, a queue length, a head address and a tail address of each queue; the head address is a storage address of reference feature information of a first sample object in the queue; the tail address is a storage address of reference feature information of a last sample object in the queue, and the queue is established on an DDR; and an analysis module configured for, by means of the fully connected layer, the performing comparative analysis on the processed feature information and reference feature information of each sample object in a queue corresponding to the target queue information and outputting a recognition result corresponding to the objects to be recognized.

In a fourth aspect, the present application discloses an electronic device, including:

a memory and a processor;

wherein the memory is configured for storing computer programs;

the processor is configured for executing the computer programs to implement the object recognition method disclosed above.

In a fifth aspect, the present application discloses a non-transitory computer-readable storage medium configured for storing computer programs, and the computer programs when executed by a processor implements an object recognition method disclosed above.

It can be seen that in the present application, by means of a convolutional layer in the convolutional neural network, pre-selected feature information of objects to be recognized is extracted, and dimension reduction processing is performed on the pre-selected feature information by using a pooling layer in the convolutional neural network, to obtain feature information of the objects to be recognized. Then the feature information is processed by means of a fully connected layer in the convolutional neural network, to obtain processed feature information, a target feature value is extracted from the processed feature information, and statistics on the number of objects to be recognized is compiled. Next, by means of the fully connected layer and according to the target feature value, it is determined, from pre-stored queue information, target queue information corresponding to the target feature value, wherein the queue information includes a queue ID, a queue length, a head address and a tail address of each queue; the head address is a storage address of reference feature information of a first sample object in the queue; the tail address is a storage address of reference feature information of a last sample object in the queue, and the queue is established on an DDR. Then by means of the fully connected layer, comparative analysis was performed on the processed feature information and reference feature information of each sample object in a queue corresponding to the target queue information, and a recognition result corresponding to the objects to be recognized is output. That is to say, in the present application, the part of implementing classification by softmax regression of the fully connected layer in the prior art is replaced. After the fully connected layer processes the feature information transmitted by the pooling layer to obtain the processed feature information, a target feature value is extracted from the processed feature information, and then the target queue information can be determined from the pre-stored queue information according to the target feature value. The comparison analysis is performed on the processed feature information and the reference feature information of each sample object in the queue corresponding to the target queue information, and a recognition result is output. In this way, only the reference feature information of each sample object in the queue corresponding to the target queue information and the processed feature information of the objects to be recognized need to be compared and analyzed, and the reference feature information of all the sample objects need not to be analyzed. The time consumed is shorter, the delay in the recognition process is reduced, and the recognition efficiency is improved. In addition, the queue corresponding to the queue information is established on the DDR, which can improve the reading speed of the reference feature information of the sample object, thereby further improving the recognition efficiency and accelerating the recognition process on the hardware level.

BRIEF DESCRIPTION OF THE DRAWINGS

In order to more clearly illustrate the technical solutions in the embodiments of the present application or the prior art, the drawings to be used in the description of the embodiments or the prior art will be briefly introduced below. Obviously, the drawings in the description below are only some embodiments of the present application. It will be apparent to those skilled in the art to obtain other drawings according to these drawings without involving any inventive effort.

FIG. 1 is a flow chart of an object recognition method disclosed in the present application;

FIG. 2 is a flow chart of a specific object recognition method disclosed in the present application;

DETAILED DESCRIPTION

Figure 3:
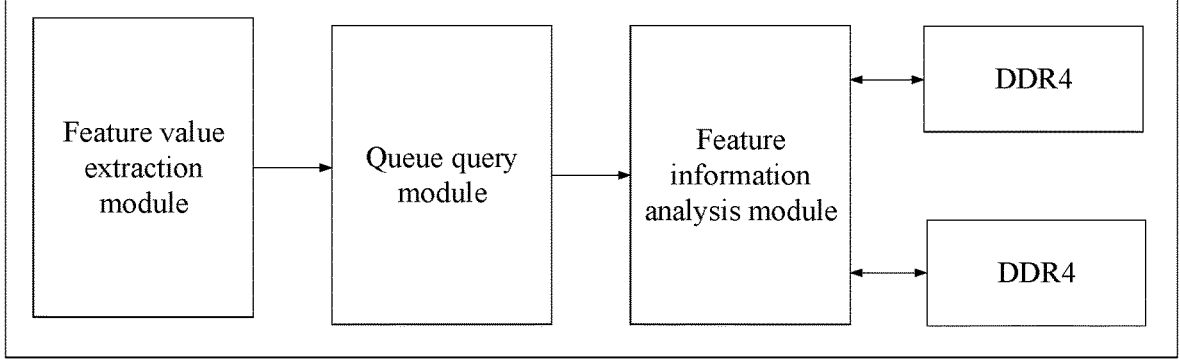
FIG. 3 is a structure diagram of a fully connected layer in a convolutional neural network disclosed in the present application.

The technical solutions in the embodiments of the application will be described clearly and completely in conjunction with the accompanying drawings in the embodiments of the application. Obviously, the described embodiments are only part of the embodiments of the application, rather than all of the embodiments. Based on the embodiments in the application, all other embodiments obtained by a person skilled in the art without involving any inventive effort are within the scope of protection of the application.

With reference to FIG. 1, the embodiment of the present application discloses an object recognition method applied to a pre-constructed convolutional neural network for object recognition, the method including:

Step S11, by means of a convolutional layer in the convolutional neural network, extracting pre-selected feature information of objects to be recognized, and performing dimension reduction processing on the pre-selected feature information by using a pooling layer in the convolutional neural network, to obtain feature information of the objects to be recognized.

During some specific implementations, it is desirable to firstly extract pre-selected feature information of the objects to be recognized from the convolutional layer in the convolutional neural network. According to some embodiments, the convolutional layer can acquire a picture of an object to be recognized, extract information of various parts in the picture to extract the pre-selected feature information of the objects to be recognized. Here, the information extracted by the convolutional layer is referred to herein as pre-selected feature information because the pre-selected feature information needs to be further processed before being used in a final classification process.

After the convolutional layer extracts the pre-selected feature information of the objects to be recognized, it is also necessary to perform dimension reduction processing on the pre-selected feature information by a pooling layer in the convolutional neural network to obtain the feature information of the objects to be recognized. The specific work processed by the pooling layer and the convolutional layer is the same as that in the prior art, and will not be described in detail here.

Step S12, processing the feature information by means of a fully connected layer in the convolutional neural network, to obtain processed feature information, extracting a target feature value from the processed feature information, and compiling statistics on the number of objects to be recognized.

After obtaining the feature information, the fully connected layer in the convolutional neural network needs to process the feature information to obtain the processed feature information. Here, the fully connected layer processes the feature information, that is to say, in the prior art, the fully connected layer processes data acquired from the pooling layer using the weight matrix.

After obtaining the processed feature information, it is also necessary to extract a target feature value from the processed feature information, and compile statistics on the number of the objects to be recognized. Herein the target feature value is a feature value which can distinguish the objects to be recognized from other objects. For example, the target feature value can be a shape value. The convolutional neural network can recognize a plurality of objects at the same time, so that the statistics on the number of the objects to be recognized needs to be compiled.

Step S13: by means of the fully connected layer and according to the target feature value, determining, from pre-stored queue information, target queue information corresponding to the target feature value, wherein the queue information includes a queue ID, a queue length, a head address and a tail address of each queue; the head address is a storage address of reference feature information of a first sample object in the queue; the tail address is a storage address of reference feature information of a last sample object in the queue, and the queue is established on an DDR.

After extracting the target feature value, the fully connected layer also needs to determine, from pre-stored queue information, target identity information corresponding to the target feature value according to the target feature value, wherein the queue information includes a queue ID (identity, queue identifier), a queue length, a head address and a tail address of each queue. The head address is a storage address of reference feature information of a first sample object in the queue. The tail address is a storage address of reference feature information of a last sample object in the queue. The queue is built on DDR (double data rate synchronous dram). The DDR can be DDR4.

Namely, different queues are established on the DDR, each queue has a corresponding queue ID, and reference feature information of each corresponding sample object is stored in each queue. The acquisition process of the reference feature information is the same as the acquisition process of the processed feature information. The target feature value extracted from the reference feature information of each sample object stored in the same queue is the same. Each queue has a corresponding queue length for indicating the amount of reference feature information stored in the queue. Each queue has a corresponding head address and tail address. The head address indicates a storage address of the reference feature information of the first sample object in the queue. The tail address is a storage address of the reference feature information of the last sample object in the queue. After extracting the target feature value of the objects to be recognized, the target queue information can be determined from the queue information according to the target feature value of the objects to be recognized.

According to some embodiments, the fully connected layer can compare the target feature value with a queue ID in various pre-stored queue information by the fully connected layer, and take the queue information with the same queue ID as the target feature value as target queue information corresponding to the target feature value, wherein the target feature value is a shape value Step S14, by means of the fully connected layer, performing comparative analysis on the processed feature information and reference feature information of each sample object in a queue corresponding to the target queue information, and outputting a recognition result corresponding to the objects to be recognized.

After determining the target queue information, the fully connected layer also needs to perform comparative analysis on the processed feature information and reference feature information of each sample object in a queue corresponding to the target queue information, and output a recognition result corresponding to the objects to be recognized.

According to some embodiments, reference feature information of each sample object in a corresponding queue is read from the DDR according to the target queue information by the fully connected layer. Each of the reference feature information is compared with the processed feature information respectively. If there is reference feature information which is the same as the processed feature information, taking a sample object corresponding to the reference feature information which is the same as the processed feature information as a recognition result corresponding to the objects to be recognized. If there is no reference feature information which is the same as the processed feature information, taking a sample object corresponding to the reference feature information with the highest similarity to the processed feature information as a recognition result corresponding to the objects to be recognized.

In the implementation process of the implementation, the number of the objects to be recognized may be larger than 1. When the number of the objects to be recognized is larger than 1, by means of the fully connected layer, parallel comparative analysis is performed on each of the processed feature information and reference feature information of each sample object in a queue corresponding to the corresponding target queue information, and a recognition result corresponding to each of the objects to be recognized is output. For example, if the number of the objects to be recognized is two, the processed feature information corresponding to the objects to be recognized 1 is A, the target queue information corresponding to A is A1, the processed feature information corresponding to the objects to be recognized 2 is B, and the target queue information corresponding to B is B1. The reference feature information of each sample object in the queue corresponding to A and A1 is compared and analyzed. At the same time, the reference feature information of each sample object in the queue corresponding to B and B1 is compared and analyzed. In this way, a plurality of objects to be recognized can be recognized in parallel, thereby improving recognition efficiency.

It can be seen that in the present application, by means of a convolutional layer in the convolutional neural network, pre-selected feature information of objects to be recognized is extracted, and dimension reduction processing is performed on the pre-selected feature information by using a pooling layer in the convolutional neural network, to obtain feature information of the objects to be recognized. Then the feature information is processed by means of a fully connected layer in the convolutional neural network, to obtain processed feature information, a target feature value is extracted from the processed feature information, and statistics on the number of objects to be recognized is compiled. Next, by means of the fully connected layer and according to the target feature value, it is determined, from pre-stored queue information, target queue information corresponding to the target feature value, wherein the queue information includes a queue ID, a queue length, a head address and a tail address of each queue; the head address is a storage address of reference feature information of a first sample object in the queue; the tail address is a storage address of reference feature information of a last sample object in the queue, and the queue is established on an DDR. Then by means of the fully connected layer, comparative analysis was performed on the processed feature information and reference feature information of each sample object in a queue corresponding to the target queue information, and a recognition result corresponding to the objects to be recognized is output. That is to say, in the present application, the part of implementing classification by softmax regression of the fully connected layer in the prior art is replaced. After the fully connected layer processes the feature information transmitted by the pooling layer to obtain the processed feature information, a target feature value is extracted from the processed feature information, and then the target queue information can be determined from the pre-stored queue information according to the target feature value. The comparison analysis is performed on the processed feature information and the reference feature information of each sample object in the queue corresponding to the target queue information, and a recognition result is output. In this way, only the reference feature information of each sample object in the queue corresponding to the target queue information and the processed feature information of the objects to be recognized need to be compared and analyzed, and the reference feature information of all the sample objects need not to be analyzed. The time consumed is shorter, the delay in the recognition process is reduced, and the recognition efficiency is improved. In addition, the queue corresponding to the queue information is established on the DDR, which can improve the reading speed of the reference feature information of the sample object, thereby further improving the recognition efficiency and accelerating the recognition process on the hardware level.

With reference to FIG. 2, the embodiment of the present application discloses a specific object recognition method applied to a pre-constructed convolutional neural network for object recognition, the method including:

Step S21, by means of a convolutional layer in the convolutional neural network, extracting pre-selected feature information of objects to be recognized, and performing dimension reduction processing on the pre-selected feature information by using a pooling layer in the convolutional neural network, to obtain feature information of the objects to be recognized.

Step S22, processing the feature information by means of a fully connected layer in the convolutional neural network, to obtain processed feature information, extracting a target feature value from the processed feature information, and compiling statistics on the number of objects to be recognized.

The specific implementation of step S21 and step S22 may refer to the disclosure of the foregoing embodiments and will not be described in detail herein.

Step S23, ranking the various pre-stored queue information according to the level of priority information in the queue information by the fully connected layer.

Step S24, comparing the target feature value with a queue ID in each of the queue information after ranking by the fully connected layer in sequence, and taking the queue information with the same queue ID as the target feature value as target queue information corresponding to the target feature value.

In a practical implementation, the queue information includes priority information and reserved fields in addition to the aforementioned column ID, queue length, head address and tail address. For example, the format of the queue information may refer to Table 1 below.

TABLE I

| Queue_id | length | First_addr | Last_addr | reserve | prio |
|---|---|---|---|---|---|

Herein, Queue_id is a queue ID, and the field length can be 12 bit. Length is a queue length, and the field length can be 10 bit. First_add is a head address of the queue, and the field length can be 32 bit. Last add is a tail address of the queue, and the field length can be 32 bit. Reserve is a reserved field, and the field length can be 38 bit. Prio is priority information, and the field length can be 4 bit.

A plurality of queues may be established on the DDR, so the queue information for the plurality of queues may be included in the queue information, for example, as shown in Table II.

TABLE II

| Queue_id | length | First_addr | Last_addr | reserve | prio |
|---|---|---|---|---|---|
| 12'h1a | 10'h3e8 | 32'h0 | 32'h3e7 | reserve | 4'h0 |
| 12'hb2 | 10'h3e8 | 32'h3e8 | 32'h7cf | reserve | 4'h0 |
| 12'hcd | 10'h3e8 | 32'h7d0 | 32'hbb7 | reserve | 4'h1 |

Herein, a first queue has a queue ID of 12'h1a, a queue length of 10'h3e8, a head address of 32'h0, a tail address of 32'h3e7, and priority information of 4'h0. A second queue has a queue ID of 12'hb2, a queue length of 10'h3e8, a head address of 32'h3e8, a tail address of 32'h7cf, and the priority information is 4'h0. A third queue has a queue ID of 12'hcd, a queue length of 10'h3e8, a head address of 32'h7dO, a tail address of 32'hbb7, and priority information of 4'hl.

When the queue information includes priority information, after extracting the target feature information, the fully connected layer determines target queue information corresponding to the target feature value from the pre-stored queue information according to the target feature value, including: ranking the various pre-stored queue information according to the level of priority information in the queue information by the fully connected layer; comparing the target feature value with a queue ID in each of the queue information after ranking by the fully connected layer in sequence, and taking the queue information with the same queue ID as the target feature value as target queue information corresponding to the target feature value.

The queue information with high priority information is processed preferentially. Usually, the priority information corresponding to a queue used for face recognition can be set with high priority. The queue with the high priority information is processed preferentially. Therefore, the pre-stored queue information can be sorted according to the high and low priority information in the queue information. Then the target feature value is compared with the queue IDs in each of the queue information after sequencing in sequence, and the queue information with the same queue ID as the target feature value is taken as target queue information corresponding to the target feature value. In this way, the queue information with high priority information is matched preferentially, so that the time for determining the target queue information can be saved, and the recognition efficiency can be further improved.

Step S25, respectively integrating each of the processed feature information with the queue length, the head address, the tail address and the priority information in the corresponding target queue information into one field by the fully connected layer to obtain an integrated field corresponding to each of the objects to be recognized.

The number of objects to be recognized may be larger than or equal to 1, that is, a plurality of objects may be recognized. Each of the processed feature information is respectively integrated with the queue length, the head address, the tail address and the priority information in the corresponding target queue information into one field by the fully connected layer to obtain an integrated field corresponding to each of the objects to be recognized.

Step S26, respectively sending each integrated field to a corresponding analysis sub-module in the fully connected layer according to the priority information in each integrated field by the priority scheduler in the fully connected layer.

After obtaining the integrated fields corresponding to each of the objects to be recognized, it is also necessary to respectively send each integrated field to a corresponding analysis sub-module in the fully connected layer according to the priority information in each integrated field by the priority scheduler in the fully connected layer.

Since the high priority information is processed with priority, it is necessary to respectively send each integrated field to a corresponding analysis sub-module in the fully connected layer according to the priority information in each integrated field by the priority scheduler in the fully connected layer. An integrated field with high priority information is preferentially sent to a corresponding analysis sub-module, and an integrated field with low priority information is sent to a corresponding analysis sub-module. Each of the analysis sub-modules is the same, and therefore the integrated field information can be sent to any idle analysis sub-module.

Step S27, outputting a corresponding recognition result of the objects to be recognized according to the received integrated field by each of the analysis sub-modules respectively.

After each integrated field is respectively sent to a corresponding analysis sub-module, each analysis sub-module needs to respectively output a corresponding recognition result of the objects to be recognized according to the received integrated field.

Here, the outputting a corresponding recognition result of the objects to be recognized according to the received integrated field, by any analysis sub-module includes: extracting the queue length, the head address and the tail address from the received integrated field by the analysis sub-module, and reading reference feature information of each of the sample objects in the corresponding queue from the DDR according to the queue length, the head address and the tail address; and extracting the processed feature information from the received integrated field by the analysis sub-module, and comparing and analyzing the processed feature information with the reference feature information of each of the sample objects respectively to output a recognition result of the objects to be recognized corresponding to the processed feature information.

With reference to FIG. 3, it is a structure diagram in the fully connected layer. The fully connected layer may include a feature value extraction module for extracting a target feature value from the processed feature information and compiling statistics on the number of objects to be recognized, and relevant steps; and a queue query module for determining target queue information corresponding to the target feature value from the pre-stored queue information according to the target feature value, and executing the relevant steps. A feature information analysis module is configured for performing comparative analysis on the processed feature information and reference feature information of each sample object in a queue corresponding to the target queue information and outputting a recognition result corresponding to the objects to be recognized to perform the steps related therewith. The fully connected layer is connected to two DDR4, and the two DDR4 are both used for establishing a queue and storing reference feature information of a corresponding sample object in the queue.

Figure 4:
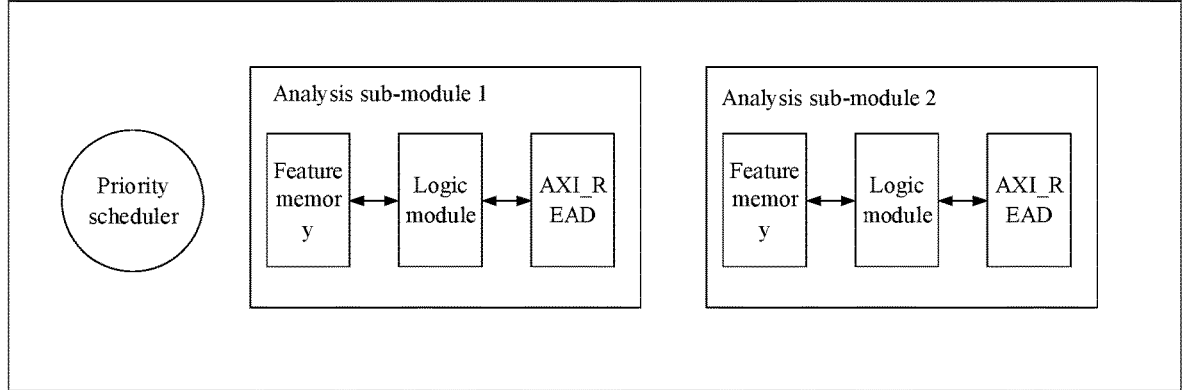
FIG. 4 is a structure diagram of a fully connected layer in a convolutional neural network disclosed in the present application.

Referring to FIG. 4, it shows a structure diagram of the feature information analysis module in FIG. 3. A priority scheduler is configured for respectively sending each integrated field to a corresponding analysis sub-module in the fully connected layer according to the priority information in each integrated field by the priority scheduler in the fully connected layer. Each analysis sub-module is configured for respectively outputting a corresponding recognition result of the objects to be recognized according to the received integrated field by each of the analysis sub-modules respectively. The AXI-READ interface in the analysis sub-module is connected to the DDR4, and is mainly used for reading data in the DDR4, with a standard AXI protocol (Advanced eXtensible Interface), that is to say, for reading reference feature information of a sample object in the DDR4. The feature memory is used for storing the reference feature information read from the DDR4, and the logic module is used for extracting a head address, a tail address and a queue length of an integrated field. According to the head address, the tail address and the queue length, the AXI-READ interface is controlled to read the DDR4, and store the read reference feature information into the feature memory. Then the logic module compares the processed feature information in the integrated field with the read reference feature information from the DDR4 to determine the recognition result.

Figure 5:
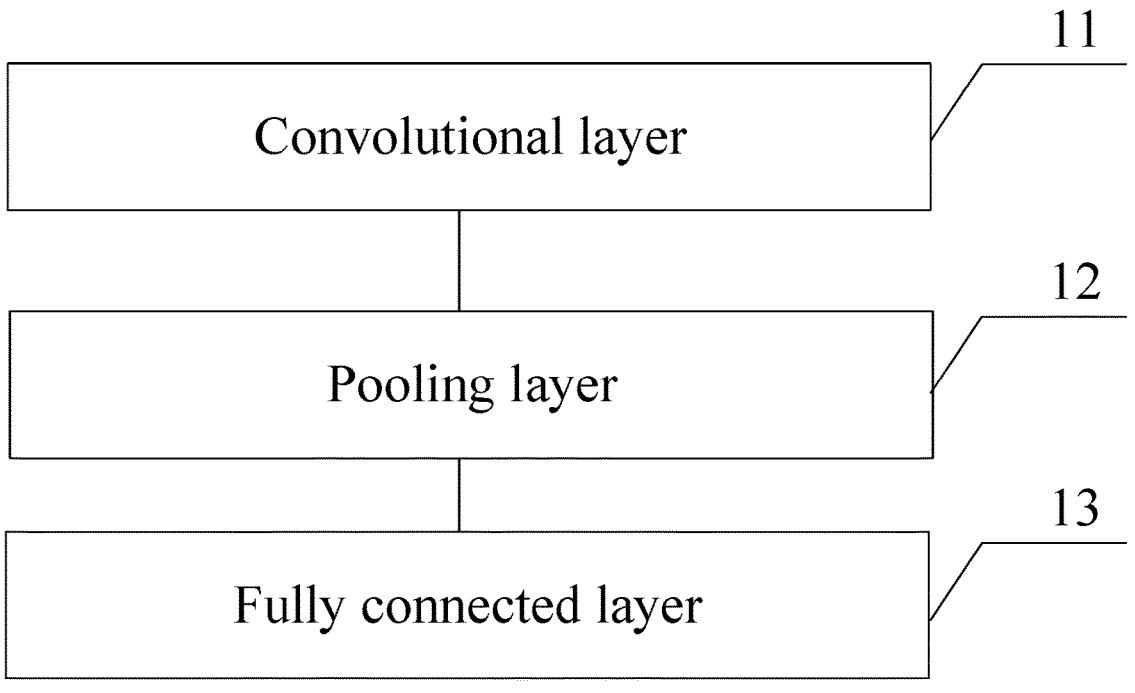
FIG. 5 is a structure diagram of an object recognition apparatus disclosed in the present application.

With reference to FIG. 5, the embodiment of the present application discloses an object recognition apparatus applied to a pre-constructed convolutional neural network for object recognition, including:

a convolutional layer 11 configured for extracting pre-selected feature information of objects to be recognized;

a pooling layer 12 configured for performing dimension reduction processing on the pre-selected feature information to obtain feature information of the objects to be recognized;

a fully connected layer 13 configured for processing the feature information to obtain processed feature information, extracting a target feature value from the processed feature information, and compiling statistics on the number of objects to be recognized;

wherein the fully connected layer 13 is configured for determining, from pre-stored queue information, target queue information corresponding to the target feature value according to the target feature value, wherein the queue information includes a queue ID, a queue length, a head address and a tail address of each queue; the head address is a storage address of reference feature information of a first sample object in the queue; the tail address is a storage address of reference feature information of a last sample object in the queue, and the queue is established on an DDR;

the fully connected layer 13 is configured for performing comparative analysis on the processed feature information and reference feature information of each sample object in a queue corresponding to the target queue information and outputting a recognition result corresponding to the objects to be recognized.

It can be seen that in the present application, by means of a convolutional layer in the convolutional neural network, pre-selected feature information of objects to be recognized is extracted, and dimension reduction processing is performed on the pre-selected feature information by using a pooling layer in the convolutional neural network, to obtain feature information of the objects to be recognized. Then the feature information is processed by means of a fully connected layer in the convolutional neural network, to obtain processed feature information, a target feature value is extracted from the processed feature information, and statistics on the number of objects to be recognized is compiled. Next, by means of the fully connected layer and according to the target feature value, it is determined, from pre-stored queue information, target queue information corresponding to the target feature value, wherein the queue information includes a queue ID, a queue length, a head address and a tail address of each queue; the head address is a storage address of reference feature information of a first sample object in the queue; the tail address is a storage address of reference feature information of a last sample object in the queue, and the queue is established on an DDR. Then by means of the fully connected layer, comparative analysis was performed on the processed feature information and reference feature information of each sample object in a queue corresponding to the target queue information, and a recognition result corresponding to the objects to be recognized is output. That is to say, in the present application, the part of implementing classification by softmax regression of the fully connected layer in the prior art is replaced. After the fully connected layer processes the feature information transmitted by the pooling layer to obtain the processed feature information, a target feature value is extracted from the processed feature information, and then the target queue information can be determined from the pre-stored queue information according to the target feature value. The comparison analysis is performed on the processed feature information and the reference feature information of each sample object in the queue corresponding to the target queue information, and a recognition result is output. In this way, only the reference feature information of each sample object in the queue corresponding to the target queue information and the processed feature information of the objects to be recognized need to be compared and analyzed, and the reference feature information of all the sample objects need not to be analyzed. The time consumed is shorter, the delay in the recognition process is reduced, and the recognition efficiency is improved. In addition, the queue corresponding to the queue information is established on the DDR, which can improve the reading speed of the reference feature information of the sample object, thereby further improving the recognition efficiency and accelerating the recognition process on the hardware level.

In some specific implementations, the fully connected layer 13 is configured for:

according to the target feature value, determining, from pre-stored queue information, target queue information corresponding to the target feature value, including:

comparing the target feature value with a queue ID in various pre-stored queue information, and taking the queue information with the same queue ID as the target feature value as target queue information corresponding to the target feature value, wherein the target feature value is a shape value.

In some specific implementations, the fully connected layer 13 is configured for:

reading reference feature information of each sample object in a corresponding queue from the DDR according to the target queue information;

comparing each of the reference feature information with the processed feature information respectively;

if there is reference feature information which is the same as the processed feature information, taking a sample object corresponding to the reference feature information which is the same as the processed feature information as a recognition result corresponding to the objects to be recognized; and if there is no reference feature information which is the same as the processed feature information, taking a sample object corresponding to the reference feature information with the highest similarity to the processed feature information as a recognition result corresponding to the objects to be recognized.

In some specific implementations, the fully connected layer 13 is configured for:

when the number of the objects to be recognized is larger than 1, performing parallel comparative analysis on each of the processed feature information and reference feature information of each sample object in a queue corresponding to the corresponding target queue information, and outputting a recognition result corresponding to each of the objects to be recognized.

In some specific implementations, the fully connected layer 13 is configured for:

ranking the various pre-stored queue information according to the level of priority information in the queue information; and comparing the target feature value with a queue ID in each of the queue information after ranking in sequence, and taking the queue information with the same queue ID as the target feature value as target queue information corresponding to the target feature value.

In some specific implementations, the fully connected layer 13 is configured for:

respectively integrating each of the processed feature information with the queue length, the head address, the tail address and the priority information in the corresponding target queue information into one field to obtain an integrated field corresponding to each of the objects to be recognized; and respectively sending each integrated field to a corresponding analysis sub-module in the fully connected layer according to the priority information in each integrated field by the priority scheduler.

outputting a corresponding recognition result of the objects to be recognized according to the received integrated field by each of the analysis sub-modules respectively.

In some specific implementations, the fully connected layer 13 is configured for:

extracting the queue length, the head address and the tail address from the received integrated field by the analysis sub-module, and reading reference feature information of each of the sample objects in the corresponding queue from the DDR according to the queue length, the head address and the tail address; and extracting the processed feature information from the received integrated field by the analysis sub-module, and comparing and analyzing the processed feature information with the reference feature information of each of the sample objects respectively to output a recognition result of the objects to be recognized corresponding to the processed feature information.

Figure 6:
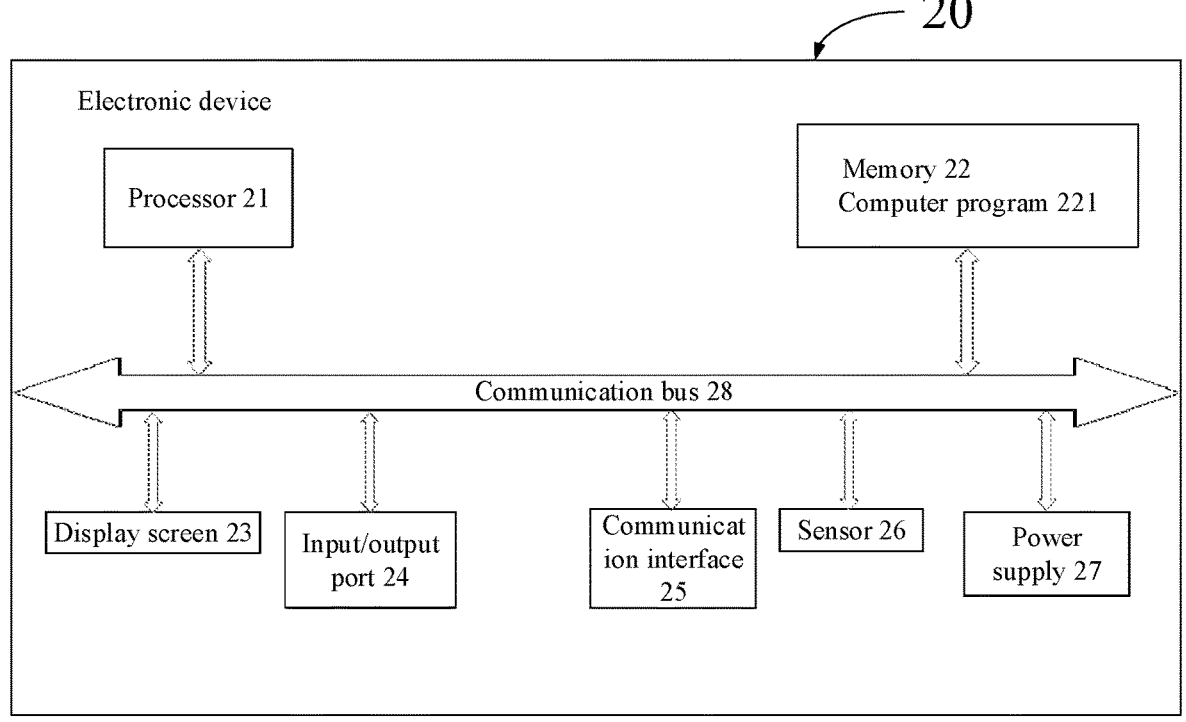
FIG. 6 is a structure diagram of an electronic device disclosed in the present application.

Referring to FIG. 6, it is a structure diagram of an electronic device 20 provided by an embodiment of the present application. The electronic device 20 may include, but is not limited to, a smart phone, a tablet computer, a notebook computer or a desktop computer.

Generally, the electronic device 20 in the present embodiment includes a processor 21 and a memory 22.

Among other things, the processor 21 may include one or more processing cores, such as a four-core processor, an eight-core processor, etc. The processor 21 may be implemented using at least one of DSP (digital signal processing), FPGA (field-programmable gate array), and PLA (programmable logic array) hardware. The processor 21 may also include a main processor and a co-processor. The main processor is a processor for processing data in a wake-up state, and is also called a CPU (Central Processing Unit). The co-processor is a low-power processor for processing data in a standby state. In some embodiments, the processor 21 may be integrated with an GPU (Graphics Processing Unit), the GPU being responsible for the rendering and drawing of images to be displayed on the display screen. In some embodiments, the processor 21 may include an AI (Artificial Intelligence) processor for processing computing operations related to machine learning.

The memory 22 may include one or more non-transitory computer-readable storage media, which may be non-transitory. The memory 22 may also include a high speed random access memory, as well as a non-volatile memory, such as one or more magnetic disk storage devices and flash memory storage devices. In this embodiment, the memory 22 is at least used to store computer programs 221 which, after being loaded and executed by the processor 21, may implement the steps of the object recognition method disclosed in any of the preceding embodiments.

In some embodiments, the electronic device 20 may also include a display screen 23, an input/output interface 24, a communication interface 25, a sensor 26, a power source 27, and a communication bus 28.

It will be appreciated by those skilled in the art that the structure illustrated in FIG. 6 is not limiting of the electronic device 20 and may include more or fewer components than those illustrated.

Further, embodiments of the present application also disclose a non-transitory computer-readable storage medium storing computer programs which, when executed by a processor, implements the object recognition method disclosed in any of the preceding embodiments.

Here, as to the specific procedure of the above object recognition method, reference may be made to the corresponding contents disclosed in the foregoing embodiments, which will not be described in detail herein.

Various embodiments are described in this description in a progressive manner, with each embodiment focusing on differences from the other embodiments, and like parts in each embodiment referring to each other. For the system disclosed in the embodiments, since it corresponds to the method disclosed in the embodiments, the depiction is relatively simple, and the related can be described with reference to the method section.

The steps of a method or algorithm described in connection with the embodiments disclosed herein may be embodied directly in hardware, in a software module executed by a processor, or in a combination of the both. The software module may reside in an RAM, a memory, an ROM, an electrically programmable ROM, an electrically erasable programmable ROM, a register, a hard disk, a removable disk, a CD-ROM, or any other form of storage medium known in the art.

Finally, it should be noted that relational terms in the text such as first and second, and the like, may be used herein to distinguish one entity or action from another entity or action without necessarily requiring or implying any such actual relationship or order between such entities or actions. The terms "including", "comprising", or any other variation thereof, are intended to cover a non-exclusive inclusion, such that a process, a method, an article, or a device that includes a list of elements does not include only those elements but may include other elements not expressly listed or inherent to such process, method, article, or device. An element defined by the language "including a" does the without more constraints, preclude the existence of additional identical elements in the process, method, article, or device that includes the element.

The object recognition method, apparatus, device and medium provided in the present application are described in detail above. While the principles and embodiments of the present application have been described herein with reference to specific examples, the foregoing description of the embodiments has been presented only to aid in the understanding of the methods and core concept of the present application. Those of ordinary skill in the art will appreciate that many changes can be made in the specific implementations and applications of the present application in light of the above teachings. In summary, the description should not be construed as limiting the application.

The invention claimed is:

1. An object recognition method, wherein the method is applied to a pre-constructed convolutional neural network for object recognition, comprising:

by means of a convolutional layer in the convolutional neural network, extracting pre-selected feature information of objects to be recognized, and performing dimension reduction processing on the pre-selected feature information by using a pooling layer in the convolutional neural network, to obtain feature information of the objects to be recognized;

processing the feature information by means of a fully connected layer in the convolutional neural network, to obtain processed feature information, extracting a target feature value from the processed feature information, and compiling statistics on the number of objects to be recognized;

by means of the fully connected layer and according to the target feature value, determining, from pre-stored queue information, target queue information corresponding to the target feature value, wherein the queue information comprises a queue ID, a queue length, a head address and a tail address of each queue; the head address is a storage address of reference feature information of a first sample object in the each queue; the tail address is a storage address of reference feature information of a last sample object in the each queue, and the each queue is established on a Double Data Rate Synchronous Dynamic Random Access Memory (DDR); and by means of the fully connected layer, performing comparative analysis on the processed feature information and reference feature information of each sample object in a queue corresponding to the target queue information, and outputting a recognition result corresponding to the objects to be recognized, wherein by means of the fully connected layer and according to the target feature value, the determining, from pre-stored queue information, target queue information corresponding to the target feature value, comprises:

ranking the various pre-stored queue information according to the level of priority information in the queue information by the fully connected layer; and comparing the target feature value with a queue ID in each of the queue information after ranking by the fully connected layer in sequence, and taking the queue information with the same queue ID as the target feature value as target queue information corresponding to the target feature value.

2. The object recognition method according to claim 1, wherein the target feature value is a shape value.

3. The object recognition method according to claim 1, wherein by means of the fully connected layer, the performing comparative analysis on the processed feature information and reference feature information of each sample object in a queue corresponding to the target queue information and outputting a recognition result corresponding to the objects to be recognized comprises:

reading reference feature information of each sample object in a corresponding queue from the DDR according to the target queue information by the fully connected layer;

comparing each of the reference feature information with the processed feature information respectively;

under the condition that there is reference feature information which is the same as the processed feature information, taking a sample object corresponding to the reference feature information which is the same as the processed feature information as a recognition result corresponding to the objects to be recognized; and under the condition that there is no reference feature information which is the same as the processed feature information, taking a sample object corresponding to the reference feature information with the highest similarity to the processed feature information as a recognition result corresponding to the objects to be recognized.

4. The object recognition method according to claim 1, wherein by means of the fully connected layer, the performing comparative analysis on the processed feature information and reference feature information of each sample object in a queue corresponding to the target queue information and outputting a recognition result corresponding to the objects to be recognized comprises:

when the number of the objects to be recognized is larger than 1, by means of the fully connected layer, performing parallel comparative analysis on each of the processed feature information and reference feature information of each sample object in a queue corresponding to the corresponding target queue information, and outputting a recognition result corresponding to each of the objects to be recognized.

5. The object recognition method according to claim 1, wherein by means of the fully connected layer, the performing comparative analysis on the processed feature information and reference feature information of each sample object in a queue corresponding to the target queue information and outputting a recognition result corresponding to the objects to be recognized comprises:

respectively integrating each of the processed feature information with the queue length, the head address, the tail address and the priority information in the corresponding target queue information into one field by the fully connected layer to obtain an integrated field corresponding to each of the objects to be recognized;

respectively sending each integrated field to a corresponding analysis sub-module in the fully connected layer according to the priority information in each integrated field by the priority scheduler in the fully connected layer; and outputting a corresponding recognition result of the objects to be recognized according to the received integrated field by each of the analysis sub-modules respectively.

6. The object recognition method according to claim 5, wherein the outputting a recognition result of the corresponding objects to be recognized according to the integrated field received by any analysis sub-module comprises:

extracting the queue length, the head address and the tail address from the received integrated field by the analysis sub-module, and reading reference feature information of each of the sample objects in the corresponding queue from the DDR according to the queue length, the head address and the tail address; and extracting the processed feature information from the received integrated field by the analysis sub-module, and comparing and analyzing the processed feature information with the reference feature information of each of the sample objects respectively to output a recognition result of the objects to be recognized corresponding to the processed feature information.

7. The object recognition method according to claim 5, wherein the queue information further comprises reserved fields.

8. An electronic device, comprising:

a memory and a processor;

wherein the memory is configured for storing computer programs; and the processor is configured for executing the computer programs to implement the object recognition method of claim 1.

9. The electronic device according to claim 8, wherein the target feature value is a shape value.

10. The electronic device according to claim 8, wherein by means of the fully connected layer, the performing comparative analysis on the processed feature information and reference feature information of each sample object in a queue corresponding to the target queue information and outputting a recognition result corresponding to the objects to be recognized comprises:

reading reference feature information of each sample object in a corresponding queue from the DDR according to the target queue information by the fully connected layer;

comparing each of the reference feature information with the processed feature information respectively;

under the condition that there is reference feature information which is the same as the processed feature information, taking a sample object corresponding to the reference feature information which is the same as the processed feature information as a recognition result corresponding to the objects to be recognized; and under the condition that there is no reference feature information which is the same as the processed feature information, taking a sample object corresponding to the reference feature information with the highest similarity to the processed feature information as a recognition result corresponding to the objects to be recognized.

11. The electronic device according to claim 8, wherein by means of the fully connected layer, the performing comparative analysis on the processed feature information and reference feature information of each sample object in a queue corresponding to the target queue information and outputting a recognition result corresponding to the objects to be recognized comprises:

when the number of the objects to be recognized is larger than 1, by means of the fully connected layer, performing parallel comparative analysis on each of the processed feature information and reference feature information of each sample object in a queue corresponding to the corresponding target queue information, and outputting a recognition result corresponding to each of the objects to be recognized.

12. The electronic device according to claim 8, wherein by means of the fully connected layer, the performing comparative analysis on the processed feature information and reference feature information of each sample object in a queue corresponding to the target queue information and outputting a recognition result corresponding to the objects to be recognized comprises:

respectively integrating each of the processed feature information with the queue length, the head address, the tail address and the priority information in the corresponding target queue information into one field by the fully connected layer to obtain an integrated field corresponding to each of the objects to be recognized;

respectively sending each integrated field to a corresponding analysis sub-module in the fully connected layer according to the priority information in each integrated field by the priority scheduler in the fully connected layer; and outputting a corresponding recognition result of the objects to be recognized according to the received integrated field by each of the analysis sub-modules respectively.

13. The electronic device according to claim 12, wherein the outputting a recognition result of the corresponding objects to be recognized according to the integrated field received by any analysis sub-module comprises:

extracting the queue length, the head address and the tail address from the received integrated field by the analysis sub-module, and reading reference feature information of each of the sample objects in the corresponding queue from the DDR according to the queue length, the head address and the tail address; and extracting the processed feature information from the received integrated field by the analysis sub-module, and comparing and analyzing the processed feature information with the reference feature information of each of the sample objects respectively to output a recognition result of the objects to be recognized corresponding to the processed feature information.

14. A non-transitory computer-readable storage medium, wherein the non-transitory computer-readable storage medium is configured for storing computer programs, and the computer programs when executed by a processor implements the object recognition method of claim 1.

15. The object recognition method according to claim 1, wherein the target feature value is a feature value which is able to distinguish the objects to be recognized from other objects.

16. The object recognition method according to claim 15, wherein the target feature value is a shape value.

17. An object recognition apparatus, wherein the apparatus is applied to a pre-constructed convolutional neural network for object recognition, comprising:

a convolutional layer configured for extracting pre-selected feature information of objects to be recognized;

a pooling layer configured for performing dimension reduction processing on the pre-selected feature information to obtain feature information of the objects to be recognized; and a fully connected layer configured for processing the feature information to obtain processed feature information, extracting a target feature value from the processed feature information, and compiling statistics on the number of objects to be recognized;

wherein the fully connected layer is configured for determining, from pre-stored queue information, target queue information corresponding to the target feature value according to the target feature value, wherein the queue information comprises a queue ID, a queue length, a head address and a tail address of each queue; the head address is a storage address of reference feature information of a first sample object in the each queue; the tail address is a storage address of reference feature information of a last sample object in the each queue, and the each queue is established on a Double Data Rate Synchronous Dynamic Random Access Memory (DDR); and the fully connected layer is configured for performing comparative analysis on the processed feature information and reference feature information of each sample object in a queue corresponding to the target queue information and outputting a recognition result corresponding to the objects to be recognized;

wherein that the fully connected layer is configured for determining, from pre-stored queue information, target queue information corresponding to the target feature value according to the target feature value, comprises:

ranking the various pre-stored queue information according to the level of priority information in the queue information by the fully connected layer; and comparing the target feature value with a queue ID in each of the queue information after ranking by the fully connected layer in sequence, and taking the queue information with the same queue ID as the target feature value as target queue information corresponding to the target feature value.

18. A convolutional neural network, comprising:

a convolutional layer configured for extracting pre-selected feature information of objects to be recognized;

a pooling layer configured for performing dimension reduction processing on the pre-selected feature information to obtain feature information of the objects to be recognized; and a fully connected layer configured for processing the feature information to obtain processed feature information, extracting a target feature value from the processed feature information, and compiling statistics on the number of objects to be recognized;

wherein the fully connected layer is configured for determining, from pre-stored queue information, target queue information corresponding to the target feature value according to the target feature value, wherein the queue information comprises a queue ID, a queue length, a head address and a tail address of each queue; the head address is a storage address of reference feature information of a first sample object in the each queue; the tail address is a storage address of reference feature information of a last sample object in the each queue, and the each queue is established on a Double Data Rate Synchronous Dynamic Random Access 5 Memory (DDR); and the fully connected layer is configured for performing comparative analysis on the processed feature information and reference feature information of each sample object in a queue corresponding to the target queue 10 information and outputting a recognition result corresponding to the objects to be recognized;

wherein that the fully connected layer is configured for determining, from pre-stored queue information, target queue information corresponding to the target feature 15 value according to the target feature value, comprises:

ranking the various pre-stored queue information according to the level of priority information in the queue information by the fully connected layer; and comparing the target feature value with a queue ID in each 20 of the queue information after ranking by the fully connected layer in sequence, and taking the queue information with the same queue ID as the target feature value as target queue information corresponding to the target feature value. 25

\* \* \* \* \*